United States Patent [19]

Curtin

[11] Patent Number: 5,000,543
[45] Date of Patent: Mar. 19, 1991

[54] 3-D VIEWERS MADE FROM SHEET MATERIALS

[76] Inventor: James Curtin, 3300 Cove Cay Rd., #7 E, Clearwater, Fla. 34620

[21] Appl. No.: 469,625

[22] Filed: Jan. 24, 1990

Related U.S. Application Data

[63] Continuation-in-part of Ser. No. 334,957, Apr. 10, 1989.

[51] Int. Cl.$^5$ .................. G02B 27/04; G02B 27/22; G02B 7/02
[52] U.S. Cl. ..................................... 350/140; 350/133
[58] Field of Search ............. 350/140, 143, 130, 250, 350/546, 145, 146, 133

[56] References Cited

U.S. PATENT DOCUMENTS

| | | | |
|---|---|---|---|
| 2,616,333 | 11/1952 | Tinker | 350/140 |
| 2,986,830 | 6/1961 | Underberg et al. | 350/140 |
| 3,847,467 | 11/1974 | Lewis | 350/140 |
| 4,268,111 | 5/1981 | Green et al. | 350/145 |
| 4,889,419 | 12/1989 | Kite | 350/631 |

FOREIGN PATENT DOCUMENTS

| | | | |
|---|---|---|---|
| 1026988 | 3/1958 | Fed. Rep. of Germany | 350/140 |
| 266869 | 3/1927 | United Kingdom | 350/140 |

*Primary Examiner*—Jon W. Henry
*Attorney, Agent, or Firm*—Joseph C. Mason, Jr.; Ronald E. Smith

[57] ABSTRACT

A 3-D viewer is created by folding paper such as card stock in a predetermined manner. A first section of the view carries a pair of 3-D lenses and a second section, which is held normal to the plane of the first section when the viewer is in use, has a longitudinal extent substantially equal to the focal length of the lenses. In a first embodiment, a third section is foldably connected to the second section, carries at least one 3-D scene, and is held generally paralle to the first section when the scenes are viewed. Other embodiments add additional sections which are foldably secured to the second or third section, a card holding member and pocket members for holding additonal 3-D scenes. Another embodiment includes slotted card members that are releasably attachable to a card holder member. A lens structure also protects the lens from abrasion and holds the lens in position so that the viewer can be mailed without being damaged.

12 Claims, 8 Drawing Sheets

3-D VIEWERS MADE FROM SHEET MATERIALS

CROSS REFERENCE TO RELATED APPLICATIONS

This disclosure is a continuation-in-part of a copending disclosure by the same inventor filed Apr. 10, 1989, entitled "3-D Viewers Made from Sheet Materials" and bearing Ser. No. 07/334,957.

TECHNICAL FIELD

This invention relates, generally, to 3-D viewers made of foldable materials. More particularly, it relates to a viewer having utility as a postcard, a magazine insert, and other items.

BACKGROUND ART

Turner U.S. Pat. Nos. 2,757,573 and Chevalier 4,660,931 disclose viewers for stereoscopic pictures in the form of foldable viewers that may be mailed in flat, relatively compact packages and then opened for viewing. Cunningham U.S. Pat. No. 4,558,528 discloses a 3-D viewer having a series of scenes. Other patents in the field of this invention that may be of interest to invention historians include U.S. Pat. Nos. 2,986,830, 2,984,153, 906,774, 2,715,853 and 2,696,754. Foreign patents of interest include French 340,661 and European 275.

DISCLOSURE OF INVENTION

A first embodiment of the present invention has the width and length of a standard U.S. Postal Service postcard when folded, and its thickness meets the standard for items mailed as postcards.

A first section or panel of the sheet material from which the invention is made is the size of a postcard; four images are positioned thereon. Two slightly different pictures of the same scene are placed in closely spaced, lateral relation to one another on a top row, and two slightly different pictures of a different scene are placed in closely spaced, lateral relation to one another on a bottom row. The scene-carrying panel is folded into a position where it is substantially perpendicular to a second panel of the device of the same size. A third panel of the device, positioned at the opposite end of the second panel, is folded into a position where it is substantially perpendicular to the second panel, i.e., the third panel is placed into substantially parallel alignment with the first panel. 3-D lenses are carried and locked into position by the third panel. Accordingly, either scene carried by the first panel is easily viewed. Advantageously, the 3-D scenes carried by the first panel may include tourist attraction scenes photographed in the area where the device is available for sale.

Numerous other embodiments of the invention are disclosed.

A general object of this invention is to promote the art of 3-D photography by opening up new ways to present such photography to the public.

Another object of this invention is to provide a postcard that contains at least one 3-D image.

Another object to advance the art of advertising by opening up new ways to advertise goods and services.

Still another important object is to advance the art of stereoscopic viewers by providing the same in simple folding carton form.

The invention accordingly comprises the features of construction, combination of elements and arrangement of parts that will be exemplified in the construction set forth hereinafter and the scope of the invention will be set forth in the claims.

DESCRIPTION OF THE DRAWINGS

For a fuller understanding of the nature and objects of the invention, reference should be made to the following detailed description, taken in connection with the accompanying drawings, in which.

Similar or identical reference numerals refer to similar parts throughout the several views of the drawings.

BEST MODES FOR CARRYING OUT THE INVENTION

Figure 1:
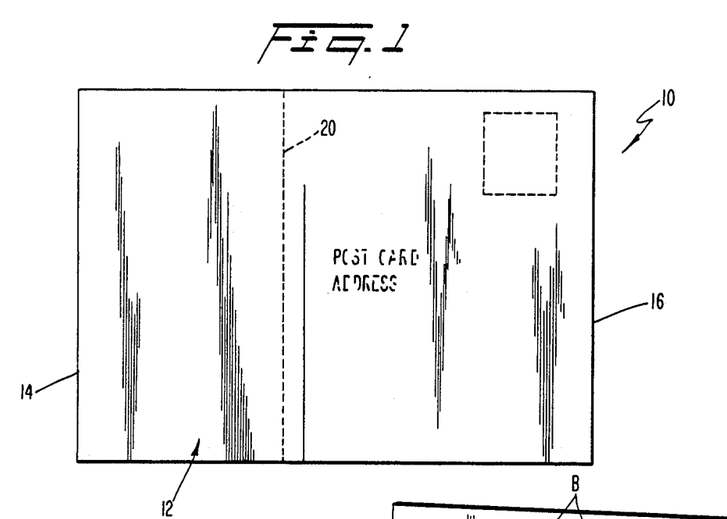
FIG. 1 is a front elevational view of a preferred embodiment of the invention when in its folded, mailable configuration.

Referring now to FIG. 1, it will there be seen that an illustrative embodiment of one of the best modes for carrying out the invention is denoted as a whole by the reference numeral 10.

Stereoscopic viewer 10 is formed of a flat sheet material such as card stock 12 or other suitable material. Although shown in rectangular form, viewer 10 could be constructed from a flat sheet material having any geometric configuration. As shown in FIG. 1, viewer 10 has the appearance and functions as a mailable post card when in its folded configuration. It may also be provided in the form of a greeting card or other type of card.

Figures 2, 3:
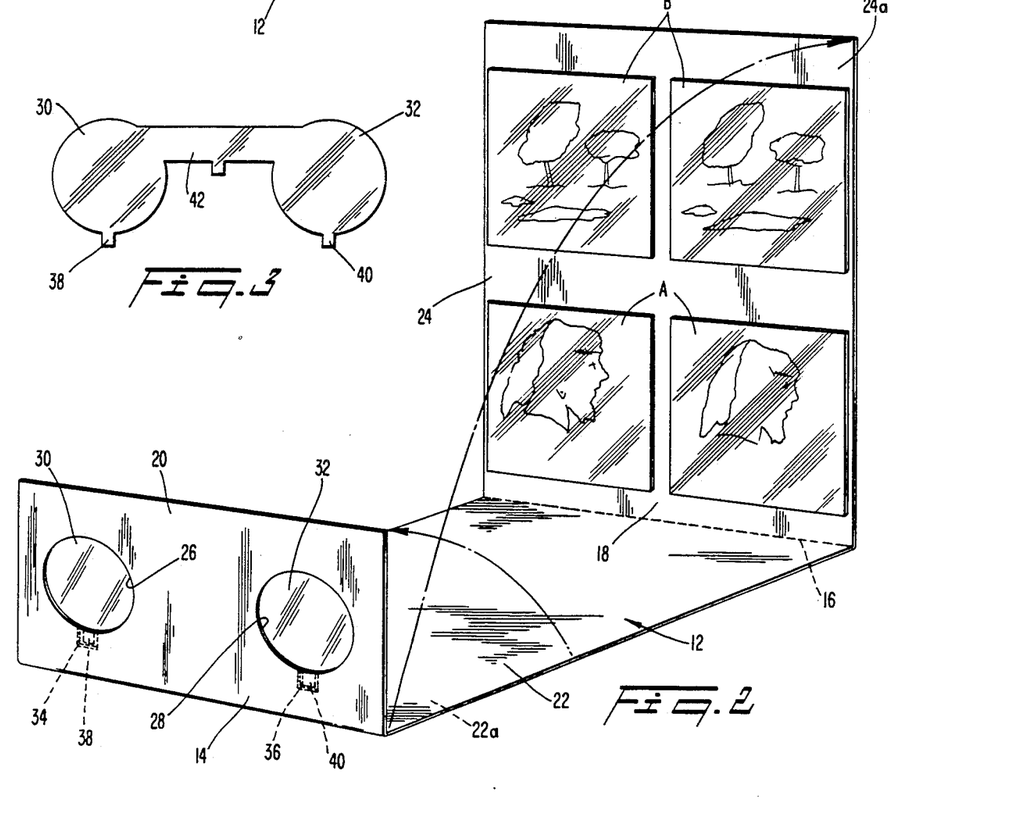
FIG. 2 is a perspective view of a first embodiment of the invention in its unfolded, operative configuration.
FIG. 3 is a plan view of the lenses of this invention.

Card stock 12, in this first embodiment, has two folding lines as perhaps best shown in FIG. 2: the first folding line 14 and second folding line 16. The folding lines are substantially parallel to one another and are disposed transverse to the longitudinal axis of symmetry 18 of card stock 12. They partition card stock 12 into three panels or sections: first section 20, second section 22 and third section 24.

Two apertures 26, 28 are formed in section 20, and each aperture receives an associated 3-D lens 30, 32. Although each lens may be locked into position by any number of suitable means, the preferred locking means includes a key way 34, 36 formed in open communication with each aperture 26, 28. A corresponding key in the form of integral projections 38, 40 formed on lenses 30, 32 respectively, fits into its associated key way and locks each lens into its operative configuration.

The lenses are shown separately in FIG. 3; there it will be seen that they are held in fixed spaced relation to one another by rigid interconnecting member 42.

The lenses are specially manufactured transparent 3-D lenses which form no part of the invention, per se.

As shown in FIG. 2, a first pair of 3-D images, each of which is denoted A, are mounted in closely spaced lateral relation to one another on opposite sides of the viewer's longitudinal axis of symmetry 18. To view the 3-D scene provided by photographs A,A section 22 is held in a generally horizontal plane, and section 20 is held in upstanding relation thereto, i.e., in a generally vertical plane, as is section 24. Thus, sections 20 and 24 are placed into substantially parallel alignment with one another. A 3-D scene then appears when one inspects images A,A through senses 30, 32. The angular orientation of any of the three sections 20, 22, 24 can be varied at the pleasure of the viewer.

A second set of images, each denoted by the reference letter B, are similarly mounted on section 24, upwardly of the photographs A,A as shown. In this manner, two entirely different 3-D scenes are provided in a single postcard. The photographs A,A and B,B are not out of focus when viewed with the unaided eye; thus, as aforesaid, lenses 30, 32 are transparent, i.e., they are not the colored lenses of the type employed when observing out-of-focus 3-D scenes.

The power of the lenses is selected so that the longitudinal extent of section 22 is substantially equal to the focal length of the lenses, i.e., the images on section 24 are in clear focus when the viewer 10 is used in the manner above described.

The reverse side 22a of panel 22 has imprinted thereon the markings of the addressable part of a postcard, and includes a designated area in the upper right hand corner thereof for a postage stamp as shown in FIG. 1.

The reverse side 24a of panel 24 is the message-carrying part of viewer 10. Thus, when section 20 is folded along fold line 14 so that it overlies section 22, and section 24 is subsequently folded along fold line 16 so that it overlies sections 20 and 22, the reverse sides 22a and 24a of panels 22 and 24, respectively, form a mailer having the general appearance of a postcard. A suitable sealing means is used to maintain the mailer in its closed configuration. Thus, the addressee, upon unfolding the mailer, is treated to at least two 3-D scenes of the locale from which the postcard originated. The embodiment shown in FIGS. 1-3 has been approved for mailing by the U.S. Postal Service.

Figure 4:
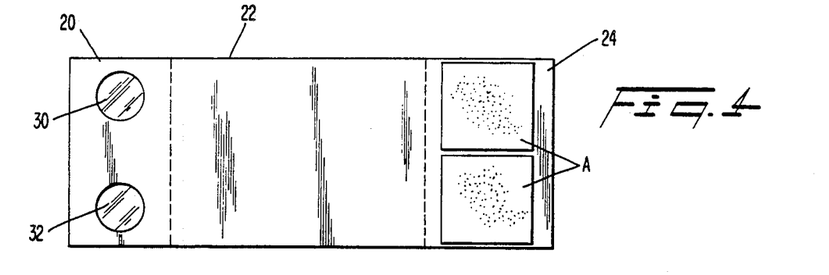
FIG. 4 is a plan view of a slightly different embodiment of the invention in its unfolded, flat configuration.

A variation of the invention is depicted in FIG. 4; in this embodiment, a single 3-D scene is provided instead of the two as in the first-described embodiment. Each scene is generated by two photographs, each denoted by the letter A. Thus, this second embodiment has little utility as a postcard although it could still be mailed as such. The reference numerals appearing in FIG. 4 indicate that the structure of this second embodiment is the same as that of the first embodiment, with the exception that the longitudinal extent of section 24 is truncated as shown.

Figure 5:
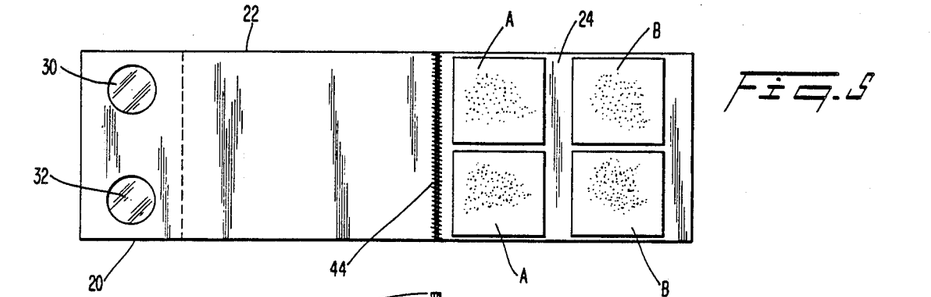
FIG. 5 is a plan view of a spiral bound version of the invention in its unfolded, flat configuration.
Figure 6:
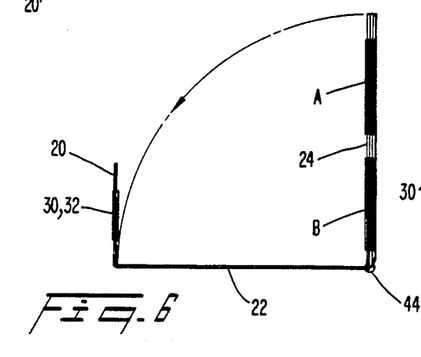
FIG. 6 is a side elevational view of the embodiment of FIG. 5 in its folded, operative configuration.

FIG. 5 depicts an embodiment that provides a plurality of panel members that correspond to section 24 of the first-described embodiment. In this embodiment, all of the panels that correspond to section 24 are collectively denoted by the same reference numeral to point out their collective equivalents to panel 24 of FIG. 1. Panels 24 are not integrally connected to panel 22; instead, fold line 16 is replaced, in effect, with a spiral-type binding means 44. Each panel is provided with a plurality of linearly aligned apertures at its base to receive spiral binding means 44 in the well known manner. Thus, two distinct scenes are observable on each of the plurality of sections 24. This embodiment is used in the manner depicted in FIG. 6.

Another variation of the invention, not shown, also employs spiral binding means 44, but only one 3-D scene is provided on its panels 24 as in the embodiment of FIG. 4.

Another unillustrated embodiment also provides multiple panels 24, but a book binding means instead of a spiral binding means 44 is employed to hingedly secure them to panel 22.

Figure 8:
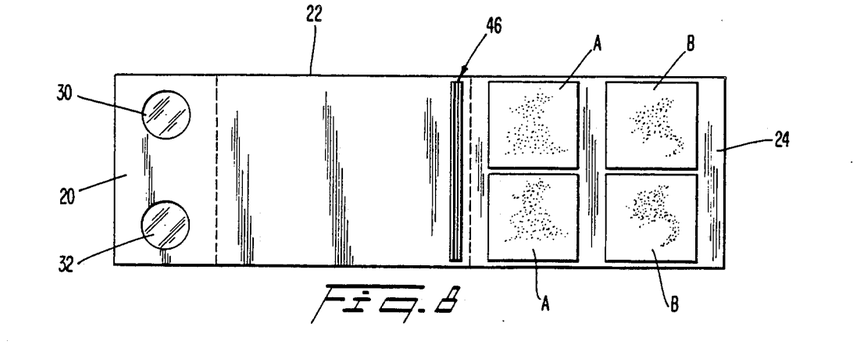
FIG. 8 is a plan view of an embodiment similar to that shown in FIG. 2 but including the auxiliary card holding means of FIG. 7.

FIG. 8 shows the embodiment of FIG. 2 modified by the addition of a card holding member 46. Multiple scene-carrying panels that are not attached or bound to panel 22 are inserted, one at a time, into card holding member 46. Again, the separate panels may carry one or more 3-D images. Card holding member 46 can be added to panel 22 of any embodiment of this invention and its provision enables the viewer to enjoy a theoretically infinite number of 3-D scenes. Advantageously, if any embodiment of this invention is used as an advertising mailer, member 46 is not included in the initial mailing due to its bulk. Its later provision, under separate cover and with additional 3-D scenes, provides an excellent follow up marketing tool.

Card holding member 46 is preferably linear in configuration as shown. It is formed of a resilient material and includes an elongate base member that is securable by suitable means to panel 22. Forward and rearward sidewalls 46a, 46b (FIG. 7) project upwardly from the opposite longitudinal edges of the base member thereof, are biased toward one another and cooperate to clampingly but releasably engage the base of cards inserted thereinto.

Figure 7:
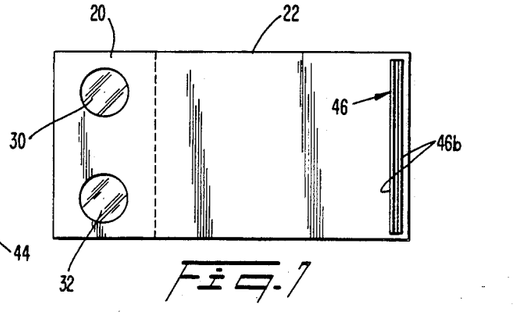
FIG. 7 is a plan view of an embodiment that includes an auxiliary card holding means.

FIG. 7 shows an embodiment having card holding member 46 positioned on section 22; there is no section 24 in this embodiment. Nonetheless, a theoretically infinite number of 3-D scenes may be viewed when this embodiment is used.

Figure 9:
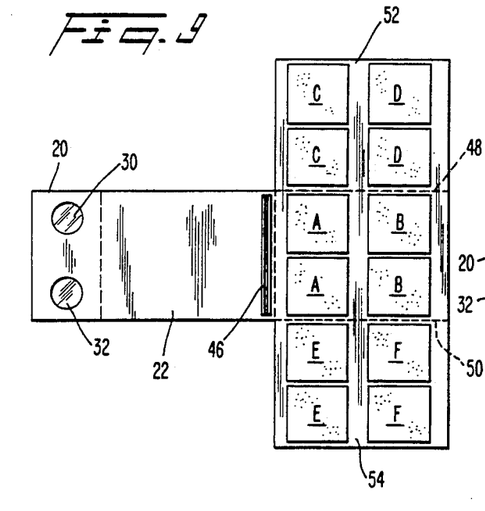
FIG. 9 is a plan view of an alternative embodiment in its unfolded configuration.

FIG. 9 shows an embodiment having scenes A,B, just as in the FIG. 2 embodiment, and additional scenes C,D,E and F provided by the photographs C,C,D,D,E,E, and F,F, respectively. Lines 48 and 50 are perforated fold lines so that the additional panels 52, 54 are folded into overlying relation to panel 24 so that the viewer can be used as a postcard in the same manner as the embodiment of FIG. 1, if desired.

Card holding member 46 is provided either with the mailer or separately; panels 52 and 54 are separated along perforation lines 48, 50, respectively and are individually inserted into card holder 46. In this manner, three panels having a total of six 3-D scenes are provided in the absence of spiral binding means 44 or an equivalent book binding means.

Figure 10:
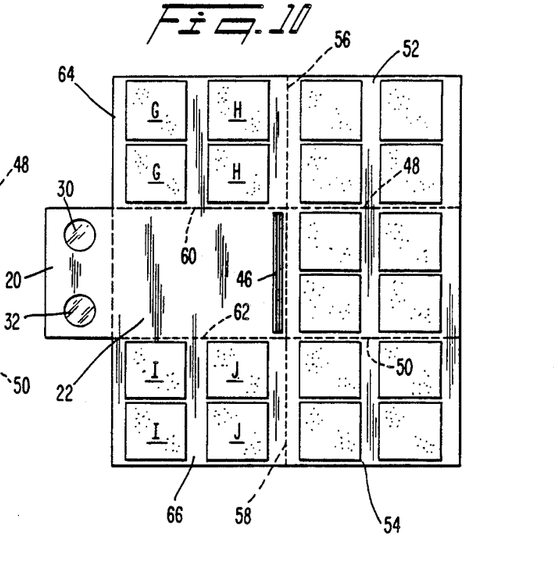
FIG. 10 is a plan view of still another embodiment in its unfolded configuration.

The embodiment of FIG. 10 includes additional perforated fold lines 56, 58 and 60, 62 to which panels 64, 66 are foldably secured. Additional photographs G,G,H,H,I,I and J,J provide for additional scenes G,H,I and J respectively. The additional panels 64, 66 are removed along their perforation lines 56, 58, 60, 62 and are individually inserted into card holder 46. Thus, this embodiment provides five panels carrying a total of ten unique 3-D scenes in the absence of spiral or other type binding means.

Clearly, now that a number of embodiments of this invention have been disclosed, an almost endless number of embellishments to the invention could be constructed; all of such embellishments are within the scope of the claims of this invention, as a matter of law.

Figures 11, 12, 13:
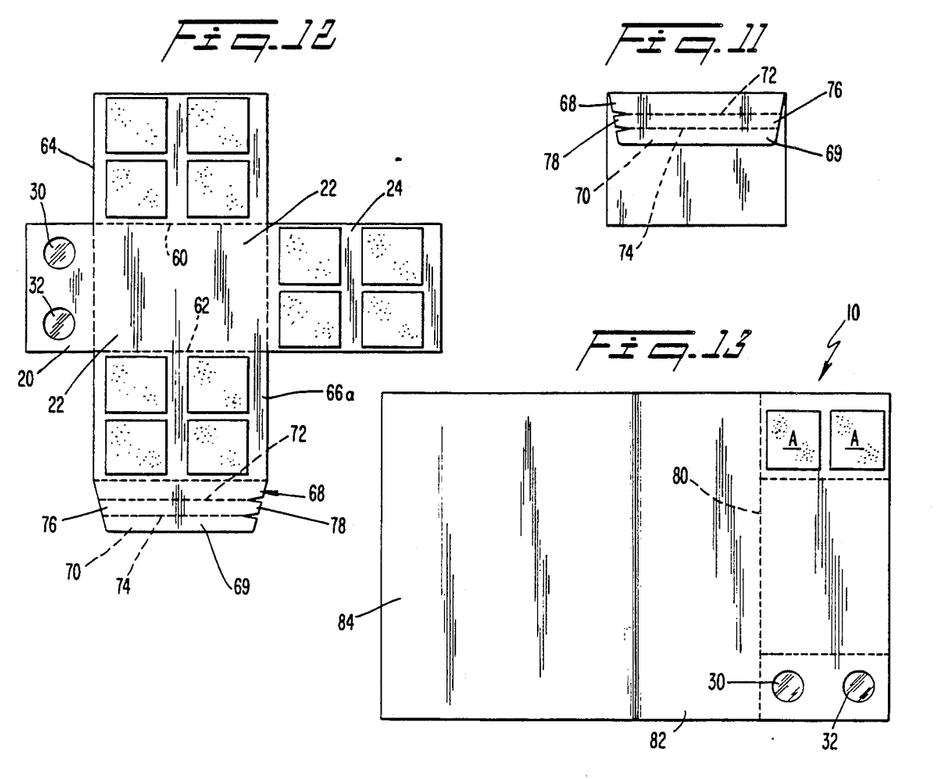
FIG. 11 is a rear elevational view of yet another embodiment in its folded, mailable configuration.
FIG. 12 is a plan view of the embodiment of FIG. 11 in its unfolded configuration.
FIG. 13 is a plan view of an embodiment having utility in connection with advertising of the type appearing in a magazine.

Auxiliary panels 64, 66a are shown in FIG. 12; this embodiment is similar to the embodiment of FIG. 10, with panels 52, 54 being removed. However, a modified panel 66a is employed instead of panel 66. Panel 66a has a sealing flap 68 added thereto. A peel and seal means 70 is provided on the outer edge 69 of flap 68 and horizontally extending perforations 72, 74 define a removable strip 76 that terminates in a pull tab 78. The viewer is prepared for mailing, display or storage by folding panels 20 and 24 into overlying relation to panel 22, followed by folding panel 64 into overlying relation to panel 24, panel 66a into overlying relation to panel 64, and, finally, the adhesive-covering seal 70 is removed from flap 69 and flap 69 is adhesively secured to the reverse side of panel 22. Pull tab 78 is pulled when it is desired to open the viewer and removable strip 76 is discarded. The outer edge 69 of flap 68 will remain secured to the reverse side of panel 22 but the removal of strip 76 enables the viewer to be unfolded. FIG. 11 shows the embodiment of FIG. 12 in its folded, mailable configuration.

Another illustrative embodiment is shown in FIG. 13; this embodiment has particular utility in connection with advertisements of the type found in magazines. In essence, the viewer 10 of FIG. 4 is secured at perforate line 80 to a page 82 in a magazine, page 84 thereof forming no part per se of this embodiment. The reader of the magazine separates the viewer and uses it in the manner described above.

Figure 14:
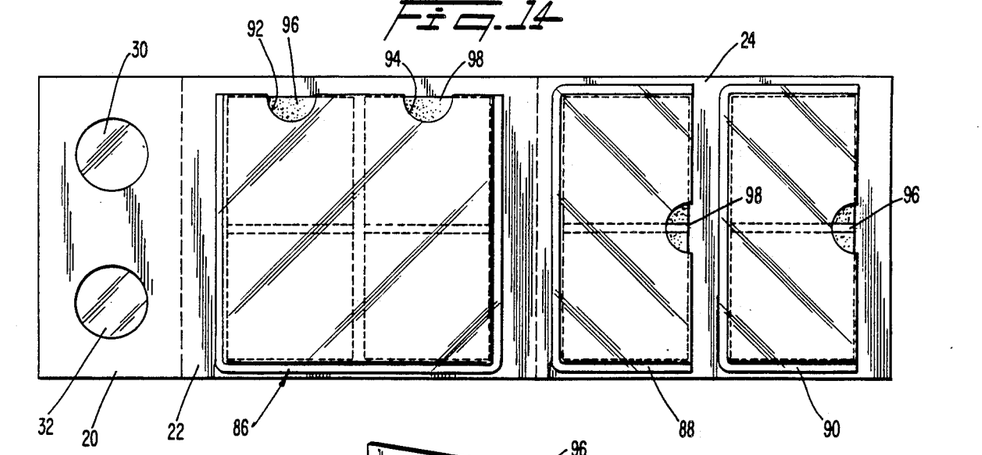
FIG. 14 is a plan view of still another embodiment in its flat configuration.
Figures 15, 16, 17:
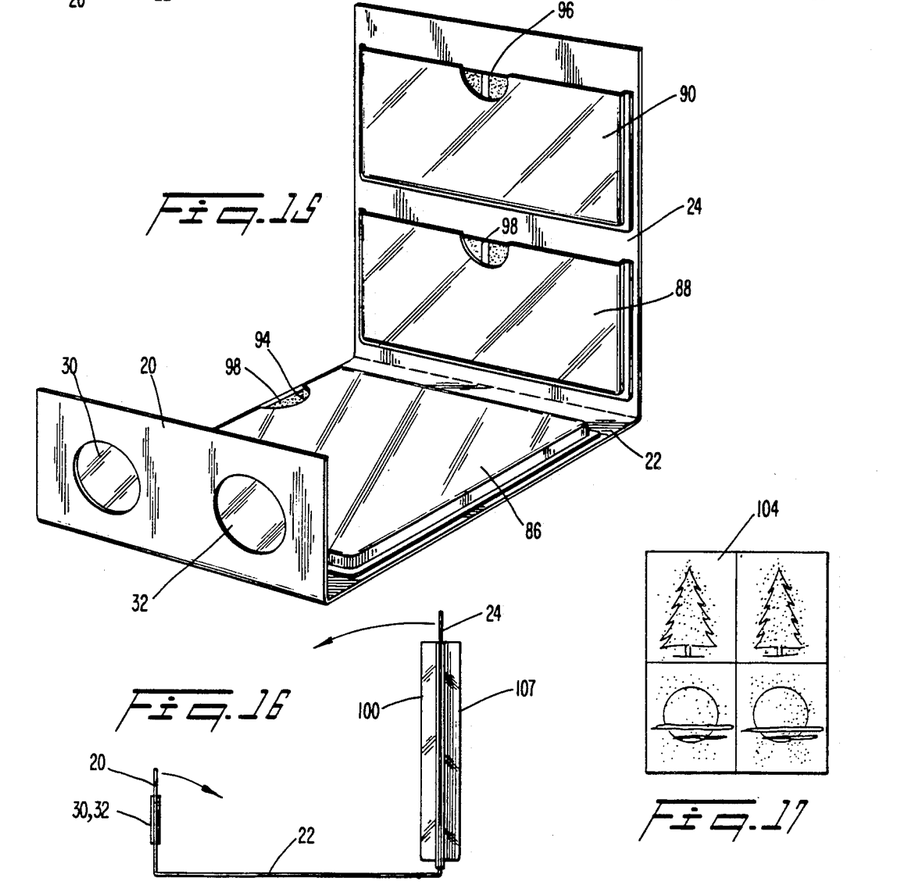
FIG. 15 is a perspective view of the embodiment of FIG. 14 in its folded, operative configuration.
FIG. 16 is a side elevational view of the penultimate illustrative embodiment.
FIG. 17 shows the type of viewer card having utility in connection with the embodiment of FIG. 16.

The embodiment of FIGS. 14 and 15 includes pocket member 86 carried by panel 22 and pocket members 88, 90 carried by panel 24. Pocket member 86 includes thumb-receiving cut away parts 92, 94; cards 96, 98 and multiple similar cards are storable in pocket 86 in stacked configuration. The depth of pocket 86 is apparent in FIG. 15.

To view the cards 96, 98, they are removed from storage pocket 86 and inserted, one at a time, into pockets 88 and 90; the latter pockets are transparent so the 3-D scenes are visible when the device is held as in FIG. 15. As shown, pockets 88, 90 are of limited storage capacity and hold but one viewing card 96, 98 at a time.

The penultimate illustrative embodiment is shown in FIG. 16; deep pocket members 100, 102 are provided on opposite sides of panel 24 as shown. A single card 104, shown in FIG. 17, carries two 3-D scenes as depicted. Plural numbers of card 104 may be stored in transparent pocket 100; after the top card has been viewed, it is transferred to rear pocket 102. This will expose to view the next card 104, bearing two additional scenes.

Clearly, in view of the suggestions of FIGS. 14-17, numerous other embodiments employing pocket members of differing card-holding capacities disposed in different positions of the viewer will be apparent to those of ordinary skill in this art. For example, the embodiments of FIGS. 1-13 could be equipped with pocket members and the pocket members could be positioned at any suitable location thereon.

Still another embodiment of the invention is depicted in FIGS. 18-28, and is denoted as a whole by the reference numeral 110.

The 3-D cards having utility in connection with this embodiment are denoted 112, collectively. As perhaps best shown in FIG. 24, each card 112 has a pair of laterally spaced slot members 114, 116 formed therein; the slots are in open communication with the bottom edge 118 of the card and have a remote or enlarged part 120, 121 of greater breadth than the narrow part 122, 123 thereof in open communication with said bottom edge 118.

A card holding member 124 is fixedly secured, by suitable means such as an adhesive, to second section 22 adjacent remote transverse end 16a thereof. As depicted, holder 124 is slightly overlaying said edge 16a, but in a commercial embodiment of the invention, the back edge 124a of holder 124 is flush with said edge 16a.

Card holder 124 includes flat bottom plate 126 that is adhered to sheet 22, and has longitudinally aligned side walls 128, 130 mounted at opposite ends thereof which project upwardly therefrom in upstanding relation thereto, and a back wall 132 that is disposed in interconnecting relation to said side walls 128, 130.

Each side wall 128, 130 has a base or lower part 134, 136 of reduced transverse dimension or thickness and a top part 138, 140 of greater thickness. Moreover, each top part 138, 140 is arcuate in configuration at its leading end, as perhaps best understood in connection with FIG. 25. As used herein, the leading end of the viewer 110 is the end thereof where lens-carrying section 20 is disposed.

Cards 112 are releasably securable to card holding member 124 when top parts 138, 140 of said holder 124 are slidably received within enlarged slot parts 120, 121 formed in said card and when base walls 132, 134 of holder 124 thereof are slidably received within the reduced slot parts 122, 123.

Figure 19:
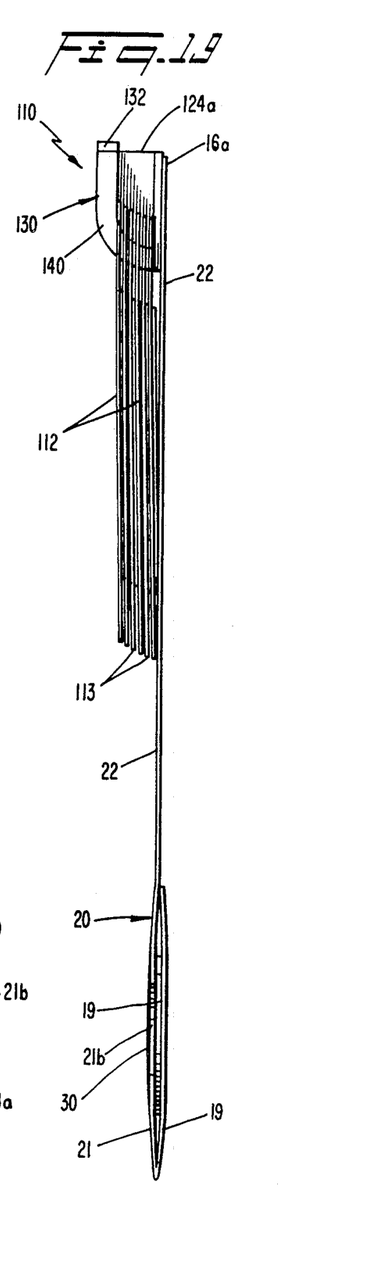
FIG. 19 is a side elevational view of the embodiment of FIG. 18.
Figure 25:
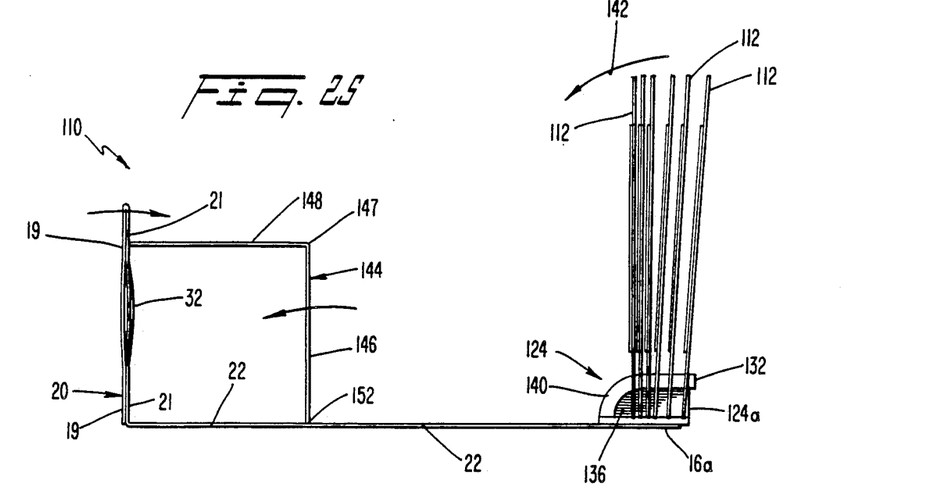
FIG. 25 is a side elevational view of the viewer of this embodiment in its operative configuration.
Figure 26:
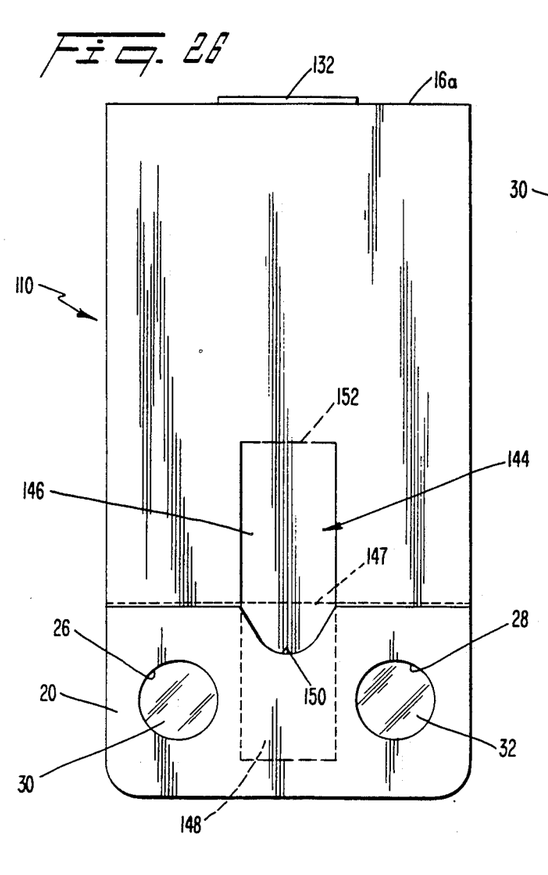
FIG. 26 is a bottom plan view of this embodiment.

Importantly, a plurality of card members 112 are releasably securable to holder member 124; all of the cards 112 may be held in an upright, viewable configuration as shown in FIG. 25, in a down position as shown in FIG. 19, or in any configuration therebetween. Thus, when viewing begins, all of the cards may be placed in an upright configuration, and the forwardmost card may be viewed. The forwardmost card is then slid forwardly relative to holder 124 as indicated by the directional arrow 142 in FIG. 25 until said card is lying down in overlying relation to section 22 so that the second card may be viewed, and so on.

Importantly, the entire set of cards may be removed, and one or more different cards carrying different 3-D scenes may be releasably attached to said holder member 124. The cards are formed of a flexible material such as card stock so that the slotted parts 114, 116 thereof are transiently deformable as the cards are inserted onto and removed from the holder member 124.

This alternative embodiment also includes a foldable septum member denoted 144 as a whole. Septum member 144, when operatively deployed as illustrated in FIG. 25, includes an upstanding first part 146 and a second, integral part 148 disposed orthogonally thereto; a transverse folding line 147 is between said parts of the septum. First part 146 serves as a septum means, as those skilled in the art will appreciate, and second part 148 serves as an interconnecting or spacing means between the first part 146 and section 20 that carries the lens members 30, 32. As best shown in FIG. 25, first part 146 is cut out of section 22 of the viewer and second part 148 is cut out of sheet 21 which is the trailing sheet of the two sheets 19, 21 that collectively form the lens holding section 20.

A nose-accommodating cut away means 150 is formed in sheets 19 and 21, along the bottom edge thereof, mid-width thereof, and said cut away means 150 performs the function its name implies.

Figure 20:
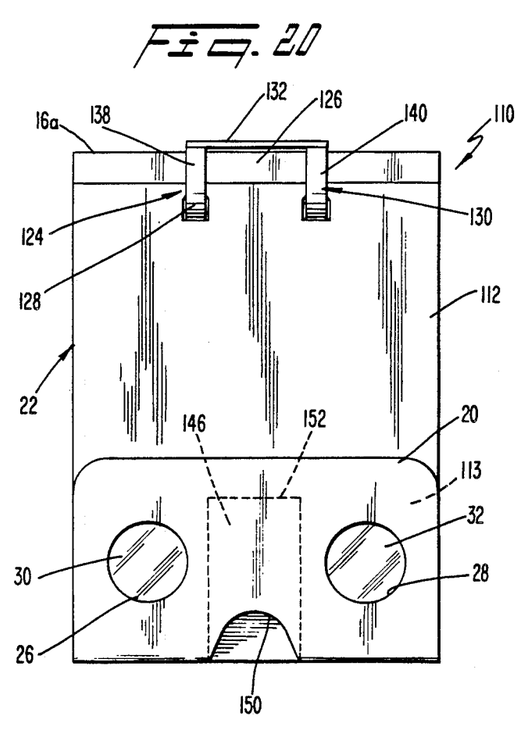
FIG. 20 is a view similar to FIG. 18, but with the lens-carrying section folded over.
Figure 21:
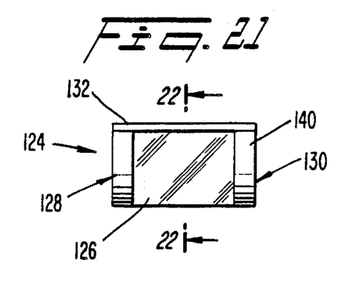
FIG. 21 is a top plan view of the card holder member of this embodiment.
Figure 22:
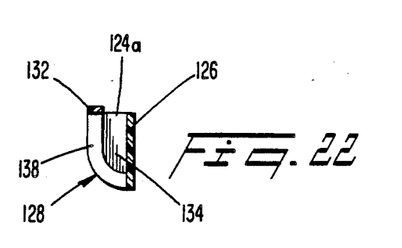
FIG. 22 is a sectional view taken along line 22—22 in FIG. 21.
Figure 23:
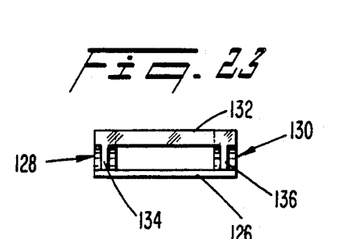
FIG. 23 is a rear elevational view of the card holder.
Figure 24:
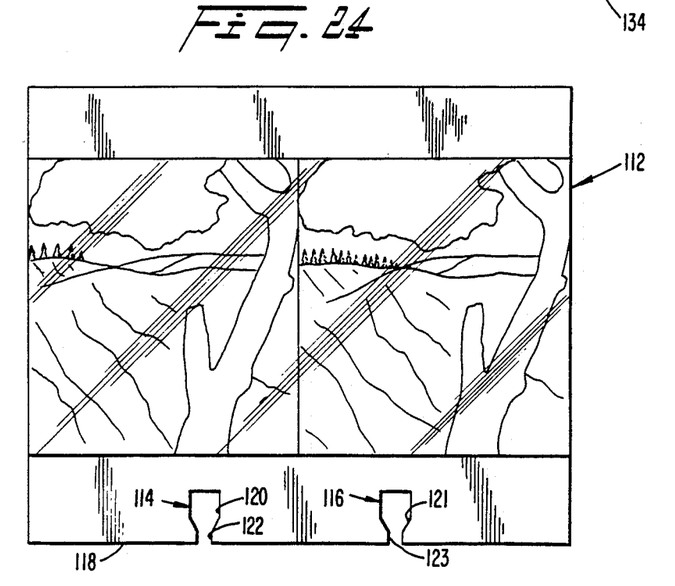
FIG. 24 is a front elevational view of the novel card of this embodiment.

FIG. 20 depicts the novel stereoscope 110 in its knocked down flat configuration; it can be mailed when in such configuration. It should be noted that each card 112 is sized such that its upper edge 113 (FIGS. 18 & 19) abuts the base 152 of septum member 144. Accordingly, the cards 112 when in their down configuration do not prevent folding of the septum member 144 in the lens-carrying section 20.

Figure 27:
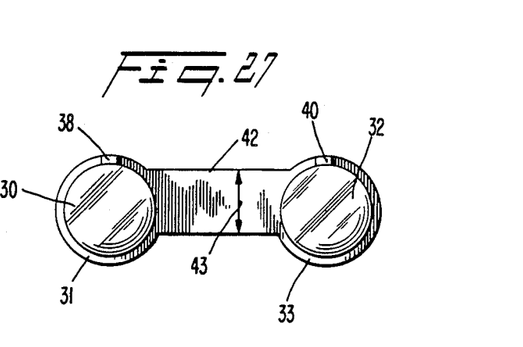
FIG. 27 is a front elevational view of the lens member of this embodiment.

The structure of the lens member of this embodiment is different from the lens member shown in FIG. 3; the improved structure is shown in FIG. 27. The parts thereof that correspond to the parts shown in FIG. 3 are denoted with the same reference numerals. Importantly, bridge piece 42 has a greater height dimension 43 as shown in FIG. 27 to better stabilize lens members 30 and 32.

Perhaps more importantly, each lens 30, 32 is circumscribed by a reduced thickness annular flange means 31, 33, respectively; the thickness of the flanges 31, 33 is the same as that of bridge piece 42.

Positioning members 38, 40 have the same thickness as lens members 30, 32 and thus project upwardly from said thin annular flanges 31, 33, respectively. The flanges and the bridge piece 42 collectively comprise a base means from which the lens members 30, 32 and the positioning members 38, 40 project.

Figure 18:
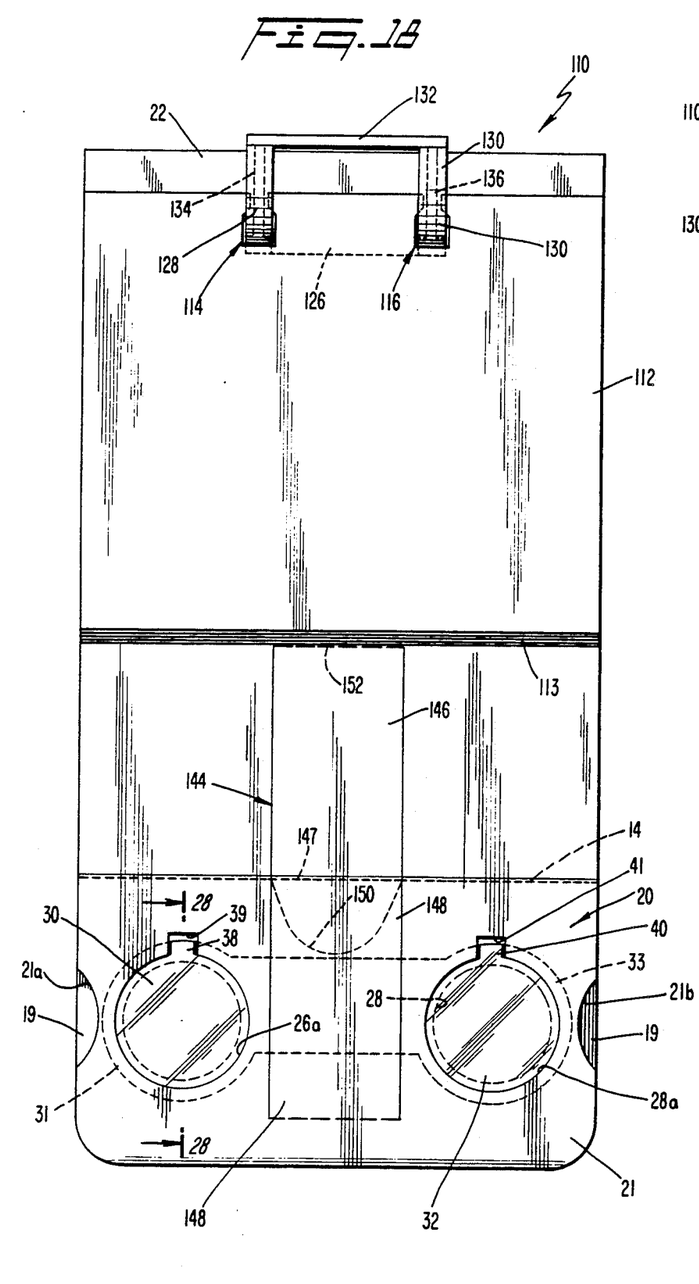
FIG. 18 is a top plan view of a final embodiment of the invention.
Figure 28:
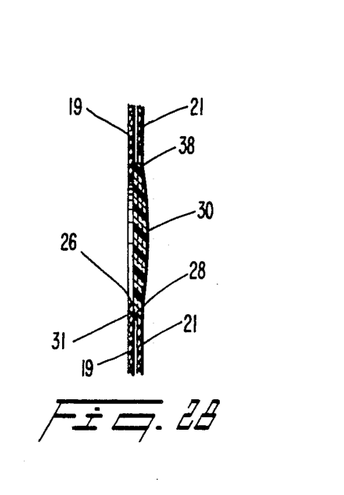
FIG. 28 is a sectional view taken along line 28—28 in FIG. 18.
Figure 29:
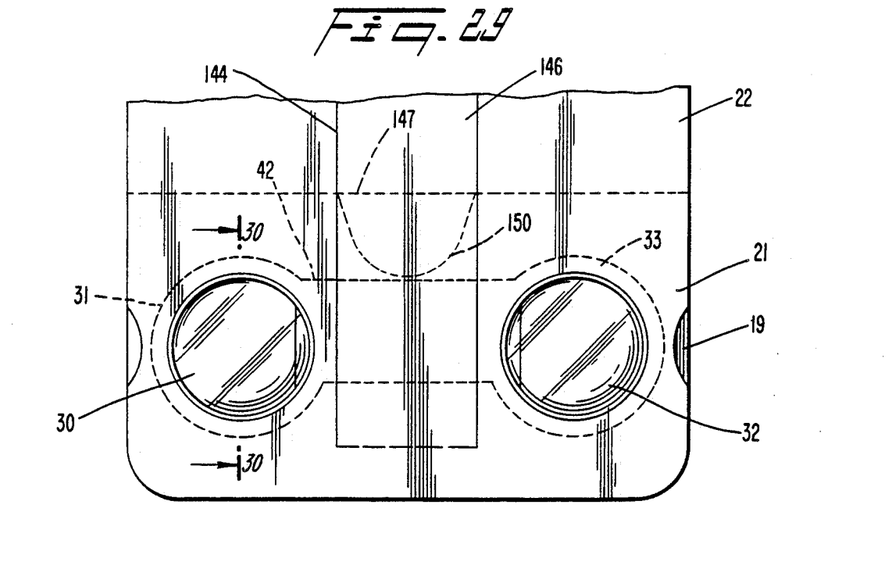
FIG. 29 is a top plan view of a final lens embodiment in its operative configuration.

As is best understood in connection with FIG. 18, each lens-receiving aperture means 26, 28 formed in leading sheet 19 of section 20 has a first predetermined diameter (FIG. 18 depicts the novel structure in actual size); a second pair of lens-receiving aperture means 26a, 28a having a slightly larger diameter is formed in trailing sheet 21 of said section 20. The diameter of flange members 31, 33 is greater than the diameter of said second aperture means 26a, 28a; accordingly, flange members 31, 33 underlie sheet 21 as shown, i.e., lens members 30, 32 in FIG. 18 are retained from moving upwardly out of the paper in FIG. 18 because sheet 21 overlies said flanges 31, 33. FIG. 28 also shows this arrangement.

The thickness of sheet 21 is substantially equal to the thickness of that part of lens 30, 32 that projects upwardly from said thin flanges, 31, 33. Thus, the lens structure is locked into position when positioning members 38, 40 are positioned in the square cut outs 39, 41 formed in sheet 21.

The thumb-receiving cut outs 21a, 21b formed in sheet 21, at transversely spaced opposite ends thereof, facilitates insertion of the lens structure.

FIG. 28 perhaps best reveals how the lens of FIG. 27 is held in sandwiched relation between sheets 19, 21 of section 20.

An improved lens design appears in FIGS. 29-33. Positioning members 38, 40 are eliminated in this lens construction; annular flanges 31, 33 remain and continue to have the same thickness as bridge member 42.

The function of the obviated positioning members 38, 40 are performed by annular lens - positioning and lens - protecting ridge members 39, 41 which circumscribe lens members 30, 32, respectively, as shown. These annular members 39, 41 hold the lens member against movement in any direction as should be clear in connection with FIG. 29, because such members project upwardly above the plane of sheet 21 when the lens member is operatively installed; as such, they do a better job than the obviated positioning members of holding the lens member against movement.

Figure 30:
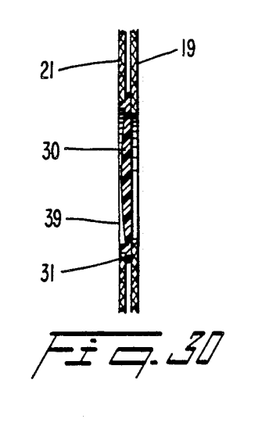
FIG. 30 is a sectional view taken along line 30—30 in FIG. 29.
Figure 31:
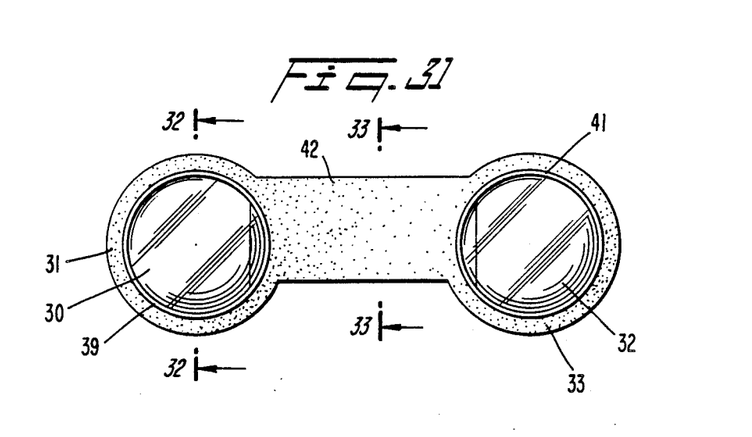
FIG. 31 is a top plan view of the final embodiment of the lens member.
Figure 32:
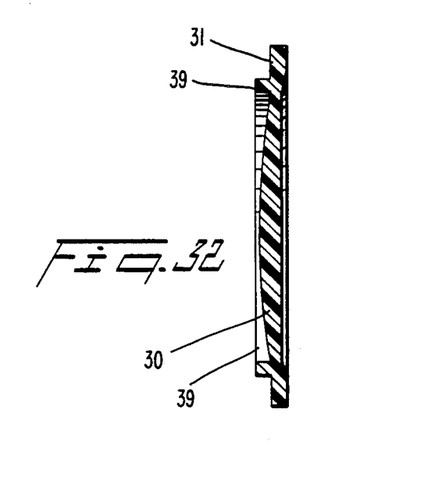
FIG. 32 is a sectional view taken along line 32—32 in FIG. 31.
Figure 33:
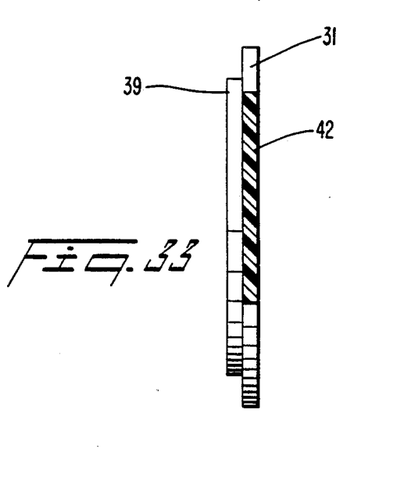
FIG. 33 is a sectional view taken along line 33—33 in FIG. 31.

Ridge members 39, 41 also perform another important function, namely, the protection of their respective lens 30, 32 from abrasion from sheet 21 when section 21 is folded into its closed configuration as perhaps best understood in connection with FIGS. 30 and 32. In FIG. 30 (an actual size view), it can be ascertained that the highest point of lens 30, i.e., the center of the lens is spaced below the highest point or uppermost edge of ridge 39. This protective feature is perhaps better understood in connection with the enlarged view of FIG. 32. The amount of space between the top of ridges 39, 41 need only be very slightly above the highest point of their associated lens 30, 32 in order to protect said lens members from abrasion as should be understood in connection with FIG. 30. In a preferred embodiment, the spacing is about 0.0001 of an inch.

The number of novel features in this unique structure is substantial. Taken individually, each feature represents an important advance in the art; taken as a whole, the novel structure represents an important breakthrough in this field of technology.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. 3-D viewer, comprising:
a first section of planar configuration;
a second section of planar configuration;
a transversely disposed folding line being formed between said first and second sections;
a first pair of laterally spaced aperture members formed in said first section;
a card holder fixedly secured to said second section adjacent a trailing edge thereof;
said first section being formed of two sheets of sheet material, said two sheets including a leading sheet and a trailing sheet, said first pair of aperture members being formed in said leading sheet, and a second pair of laterally spaced aperture members being formed in said trailing sheet in substantial registration with said first pair of aperture members;
a predetermined diameter of said second pair of aperture members being greater than a predetermined diameter of said first pair of aperture members;
a pair of lens members, said pair of lens members being interconnected by a flat bridge means;
a thin annular flange means circumscribing each lens member of said pair of lens members;
a predetermined thickness of said bridge means being substantially equal to a predetermined thickness of said annular flange means; and
said bridge means and said annular flange means being coplanar and collectively forming a base means for said pair of lens members, each member of said pair of lens members being mounted on said base means in concentric relation with its associated annular flange means and each member of said pair of lens members projecting upwardly from said base means, said base means being transparent and forming a part of said lens members.

2. The viewer of claim 1, further comprising a pair of laterally spaced lens positioning members, each lens positioning member being integral to an associated lens member, and each lens positioning member having a predetermined thickness substantially the same as the thickness of each member of said pair of lens members.

3. The viewer of claim 2, wherein said lens member is slidably positioned between said first and second sheet members that collectively form said first section.

4. The viewer of claim 3, wherein said annular flange means has a predetermined diameter greater than the predetermined diameter of said second pair of aperture members and wherein each member of said pair of lens members has a predetermined diameter substantially equal to the predetermined diameter of said second pair of aperture members so that when said lens member is positioned between said first and second sheets, said trailing sheet of said first section overlies said annular flange means.

5. The viewer of claim 4, further comprising a substantially square cut out means formed in said second sheet member in juxtaposition with each of said second pair of aperture members, said cut out means configured and dimensioned to receive an associated lens positioning member.

6. The viewer of claim 5, wherein said trailing sheet of said first section has a predetermined thickness substantially equal to the predetermined thickness of each lens member so that the convex surface of each lens member is substantially coplanar with said trailing sheet of said first section when said lens is disposed between said leading and trailing sheets.

7. The viewer of claim 6, further comprising a septum means having a first part cut out of said second section and an integral second part cut out of said trailing sheet of said first section.

8. The viewer of claim 7, further comprising a first transversely disposed folding line formed at a leading end of said first part of said septum means and a second transversely disposed folding line formed at a trailing end of said second part of said septum means, said first and second folding lines being coextensive with the breadth of said septum means, and said breadth being less than a predetermined spacing between said lens members.

9. The viewer of claim 8, wherein said first transversely disposed folding line is longitudinally spaced from the leading end of said card holder by a distance sufficient to receive a card member therebetween when said card member bottom edge is releasably secured to said card holder and when said card member is disposed in overlying relation to said second section.

10. The viewer of claim 1, further comprising a pair of annular lens positioning and lens protecting members, each of which is associated with a different lens member, each of which circumscribes its associated lens member, and each of which has an uppermost annular edge that extends by a predetermined distance beyond a highest point of its associated lens member.

11. The viewer of claim 10, wherein the highest point of each lens member is the center thereof and wherein said predetermined distance is about 0.0001 of an inch.

12. The viewer of claim 8, further comprising a folding line formed in said septum means midway between said first transversely disposed folding line formed at the leading end of said first part of said septum means and said second transversely disposed folding line formed at the trailing end of said second part of said septum means.

* * * * *